United States Patent [19]

Dolan

[11] Patent Number: 4,739,343

[45] Date of Patent: Apr. 19, 1988

[54] THERMAL PRINTING SYSTEM FOR POSTAGE METER MAILING MACHINE APPLICATION

[75] Inventor: Donald T. Dolan, Ridgefield, Conn.

[73] Assignee: Pitney Bowes Inc., Stamford, Conn.

[21] Appl. No.: 880,413

[22] Filed: Jun. 30, 1986

Related U.S. Application Data

[63] Continuation of Ser. No. 861,218, May 9, 1986, abandoned.

[51] Int. Cl.⁴ .......................... G01D 15/10; B41J 3/20; B65H 5/22; G06F 1/106

[52] U.S. Cl. ................................ 346/76 PH; 346/136; 101/66; 101/71; 101/288; 156/384; 235/101; 235/432; 271/2; 271/9; 400/120; 400/224.1; 400/207; 400/624

[58] Field of Search .................... 346/1.1, 76 PH, 136; 428/913; 430/138, 348; 400/120, 224.1, 12, 207, 208, 624, 625; 271/2, 9; 101/66, 71, 288; 156/384; 235/101, 432

[56] References Cited

U.S. PATENT DOCUMENTS

| | | | |
|---|---|---|---|
| 4,568,949 | 2/1986 | Muranaka | 346/76 PH |
| 4,568,950 | 2/1986 | Ross et al. | 346/76 PH |
| 4,568,951 | 2/1986 | Hasegawa et al. | 346/76 PH |
| 4,577,198 | 3/1986 | Hibino et al. | 346/76 PH |
| 4,577,199 | 3/1986 | Saiki et al. | 346/76 PH |
| 4,580,142 | 4/1986 | Matsushita et al. | 346/1.1 |

FOREIGN PATENT DOCUMENTS 57-150587 3/1982 Japan .

*Primary Examiner*—E. A. Goldberg
*Assistant Examiner*—Gerald E. Preston
*Attorney, Agent, or Firm*—Charles G. Parks, Jr.; David E. Pitchenik; Melvin J. Scolnick

[57] ABSTRACT

The electronic postage meter includes a microcomputer controlled thermal head opposite a scavenging roller and suitable means of cleaning the scavenging roller. A cassette containing a thermal transfer tape coated on one side with a thermal sensitive ink is received within a cartridge slot in the postage meter. The thermal tape is threaded within the cartridge to journal from a feed reel beyond a guide roller, between a thermal head and scavenging roller, to a transfer roller and be received by a take-up reel, the scavenging roller and thermal head being constituent of the postage meter. The mailing machine includes a back-up roller bias peripherally opposite the transfer roller. An image is traced on the thermal tape by the thermal head in response to a microcomputer constituent to the postage meter. The thermal tape is driven therefrom to the transfer roller which is maintained at a temperature substantially above the ink transfer temperature of the thermal tape to be imparted on a traversing mailpiece along a mailing machine deck.

8 Claims, 4 Drawing Sheets

THERMAL PRINTING SYSTEM FOR POSTAGE METER MAILING MACHINE APPLICATION

CROSS REFERENCE TO RELATED APPLICATION

This is a continuation of application Ser. No. 861,218 filed May 5, 1986, now abandoned.

BACKGROUND OF THE INVENTION

This invention relates to printing means and, more particularly, to thermal printing means suited to impart an indicia to a workpiece, e.g., a mail envelope, wherein the thermal printing means can suitably accommodate workpieces of varying surface texture.

Thermal transfer or printing of an image to a workpiece is a known technology. Generally, thermal printing utilizes a thermal print head consisting of a linear array of "ON-OFF" heating elements. Each element can be individually actuated in binary response to a generated bit input signal. Customarily, a control signal is generated by a control means, such as a programmable microcomputer, wherein a series of byte codes are transmitted to the thermal print head gating the individual heating elements to either an "ON" or "OFF" state in response to the control signal. A thermal tape coated on one side with thermally sensitive ink is passed between the thermal print head and a traversing workpiece. In response to the gating pattern of the print head elements, a series of dots and spaces are created on the workpiece. As the gate information is sequentially transmitted to the thermal head in synchronized relationship to traversing thermal tape and workpiece, an image is thereby imprinted to the workpiece.

Thermal printing offers a most important advantage over die cast image transfer techniques, in that images transferred by thermal printing have a superior resolution quality. However, thermal printing is sensitive to the workpiece image transfer surface area texture or roughness. The sensitivity is predicated on the limitation that the thermal head cannot be subjected to high compression loads. Therefore, the contact pressure between the workpiece thermal tape and thermal head must be maintained at a relatively low level. A workpiece having a rough surface texture has reduced surface contact with the thermal tape due to radical variation of cross-section surface contour as compared to a workpiece having a smooth surface contact area. As a result, a workpiece with a rough surface texture subjected to thermal image transfer receives an image lacking in resolution and contrast.

It would be advantageous if rough workpieces could be imaged by thermal transfer techniques in a manner preserving the superior imaging capabilities of thermal printing. In addition thermal printers are programmable. The programmable capability of thermal printing systems allows imaging flexibility which is not achievable with conventional die cast methods.

SUMMARY OF THE INVENTION

It is an object of the present invention to present a thermal image transfer apparatus and system which can accommodate workpieces of varying surface textures without substantial diminution in image resolution as a function of workpiece surface transfer area roughness.

It is a further objective of the present invention to present a thermal image transfer system and apparatus particularly suited for postage metering of mailpieces.

It is a still further objective of the present invention to present a thermal image transfer system particularly suited for employment in an electronic postage meter suitable for imparting a postage image on a workpiece stream traversing a postage meter mailing machine.

Illustratively, an electronic postage meter is mounted to a mailing machine such that a mailpiece stream can be delivered to a printing station. The electronic postage meter includes an input keyboard which communicates with a microcomputer which in turn, and among other things, generates a bit information stream for delivery to a thermal transfer head constituent to the electronic postal meter. The electronic postal meter contains a cartridge or cassette receiving section in the print station vicinity for receiving a thermal transfer tape cassette. The cassette contains a singularly discontinuous thermal transfer tape coated on one side with thermally sensitive ink. The tape is substantially wrapped around a supply reel rotatably mounted in the cassette and threaded therefrom sequentially around a first guide roller, a transfer roller, a second guide roller and a take-up reel. When inserted into a mailing machine suitably adapted for receiving the cassette, the tape is traversed between the scavenging roller and thermal head. The thermal head may be positionable by a position solenoid to facilitate entry of the cassette. Further included in the mailing machine is a blade and collection box or other suitable means of providing continuous cleaning of the scavenging roller.

The mailing machine which includes a mailpiece transfer deck having a platen in the printing station area. The platen contains a slot through which a back-up roller is biased against the transfer roller of the cassette in a tangentially peripheral manner.

In operation, the microcomputer generates binary information which is sequentially transmitted to the thermal head which then causes a image to be traced on the thermal tape as the tape traverses the scavenging roller and thermal head. The image is imparted to the a now traversing mailpiece between the back-up roller and the transfer roller which is maintained at a temperature substantially higher than the threshold ink transfer temperature. It is appreciated that by segregating the image generation and image transfer functions increased pressure can be applied during image transfer and, thereby, causing compression of the mailpiece surface area facilitating a higher resolution image transfer making the transfer system substantially less sensitive to mailpiece surface texture.

BRIEF DESCRIPTION THE DRAWINGS

Figure 4A:
Figure 4B:
Figure 4C:

FIGS. 4A, 4B, and 4C are schematic representations of the thermal tape in various positions along the cassette track in accordance with the present invention.

Figure 5:
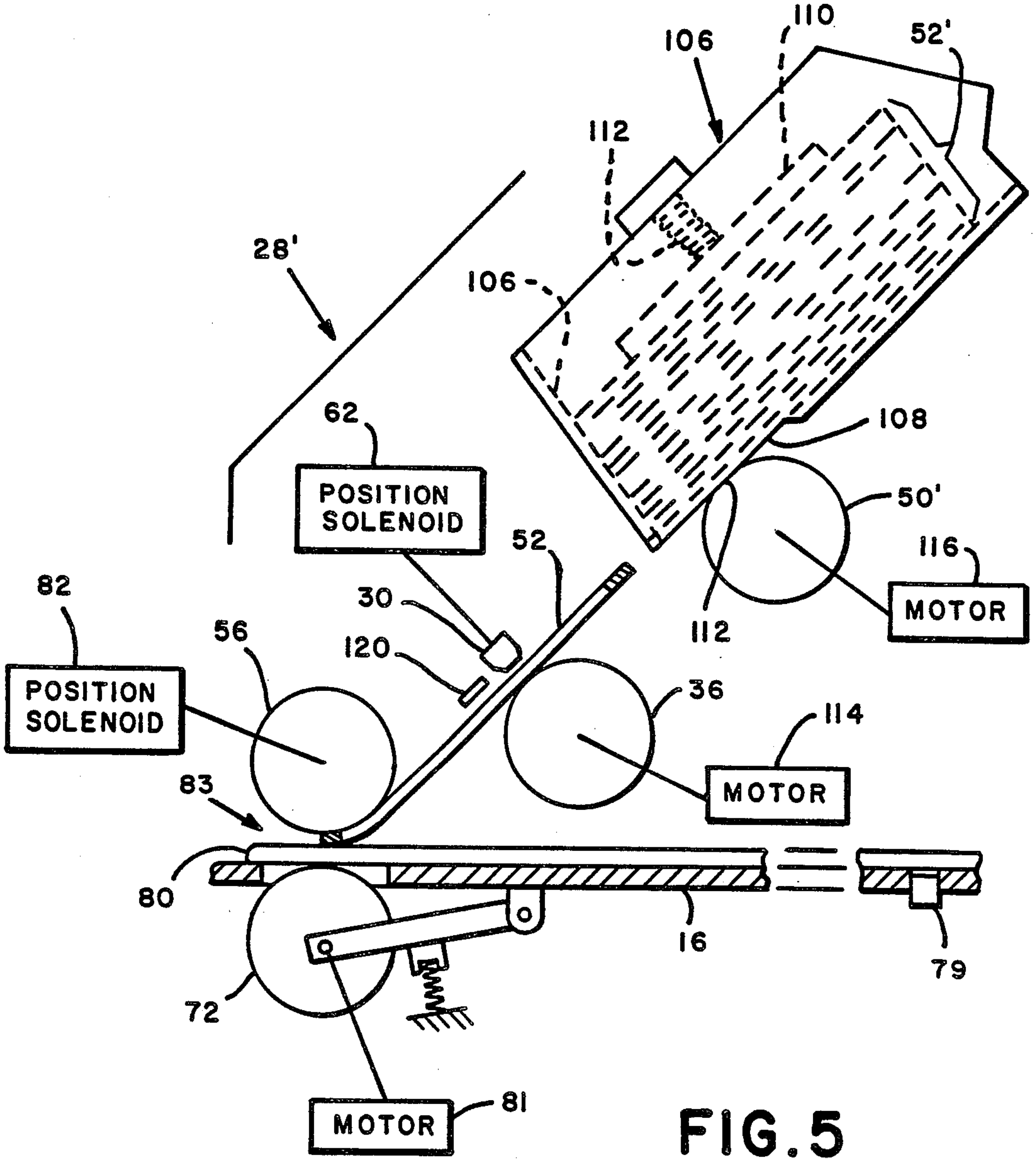

FIG. 5 is a schematic sectional view of one of the alternative embodiments of the transfer tape cassette in accordance with the present invention.

Figure 6:
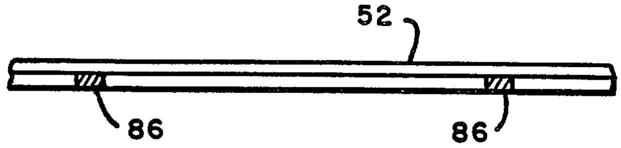

FIG. 6 is a sectioned view of an alternative thermotape configuration in accordance with the present invention.

DETAILED DESCRIPTION OF PREFERRED EMBODIMENT

The invention as depicted in its preferred embodiment is illustrated as a constituent to an electronic postage meter mailing machine for the purpose of imprinting a postage indicia on a mailpiece. It should be well appreciated that the invention subsequently described in its preferred embodiment is well suited for employment in any like printing applications.

Figure 1:
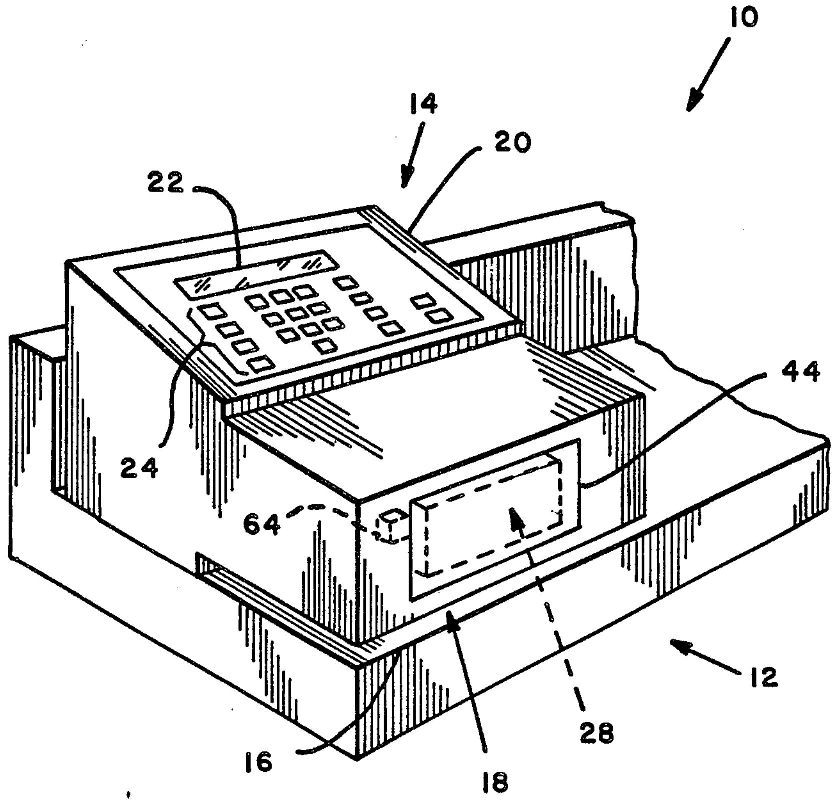
FIG. 1 is a partial perspective view of a postage meter mailing machine.

Referring to FIG. 1, an electronic postage meter mailing machine, generally indicated as 10, includes a mailing machine 12 adapted to receive mailpieces, either by automatic means, such as, by a feeder (not shown), or manually, and a electronic postage meter, hereafter referred to as meter 14. The meter 14 is mounted, customarily detachably, to the mailing machine 12 such that a portion of the meter 14 is positioned in spaced relationship opposite the mailing machine platen 16 to define an indicia printing station, generally indicated as 18. The meter 14 is generally comprised of a housing 20 having a video display screen 22, a plurality a keys 24 operative communicating with electronic circuit means 25 located within the housing 20 in any suitably manner.

Figure 2:
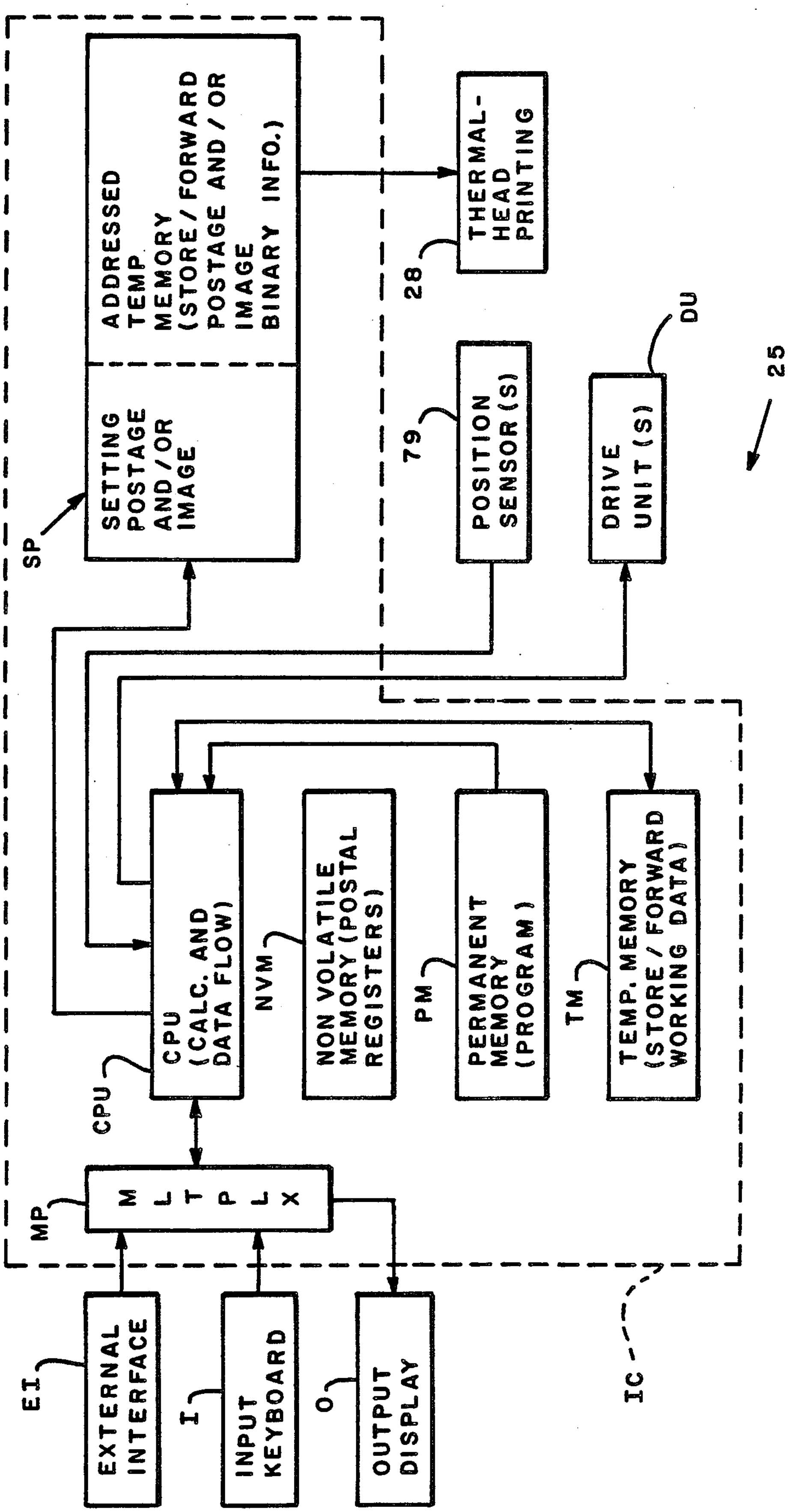
FIG. 2 is a schematic of a electronic control system suited for employment in an electronic postage meter and well suited for the present invention.

Referring now to FIGS. 1 and 2, the general functional arrangement of the computerized postal meter system of the present invention is known. The heart of the system is the CPU and it performs two basic functions; performance of calculations based on input data; and, controlling the flow of data between various memory unit. Two basic memory units are employed with the CPU. The first is the permanent memory PM which is a non-alterable memory storing a specific sequence of operations for performing postal data calculations in accordance with certain predetermined inputs as well as performing other routines for operating the system. The second memory unit is a temporary memory TM which interacts with the CPU for forming a temporary storage, holding and forwarding working data in accordance with the calculations being performed by the CPU. An additional memory component NVM is also coupled to the CPU and performs a storage function which is very significant in the system operation of a postal data system. The NVM is a nonvolatile memory which acts to store certain critical information employed in the postal system as part of a predetermined routine activated upon start-up. The function of this routine is to stored in the NVM (non-volatile memory) crucial accounting functions such as descending balances or ascending credits and the like, and store them wherein they may be held while the machine is de-energized and recalled upon a subsequent start-up. In this manner, the computer system may continually act upon these balances in the NVM without fear of loss of this information upon shut-down.

The system operates in accordance with data applied from an appropriate input means I or an external interface EI, such as, a scale, external computer, mail management systems, etc. This data is fed into the CPU under control of the program in the permanent memory. At any time during the operation of the system, should the contents of the temporary memory storing the appropriate credit debit balances or other accumulations in accordance with the various features of the system be desired to be displayed, an appropriate instruction provided by the input means I causes the CPU to access the desired location storing the information requested. The information is provided through the CPU into the output display unit O. The input and output units may be multiplexed by a multiplex unit MP to and from the CPU. A more detailed description of a microcomputer system, such as here briefly described can be found in U.S. Pat. No. 4,568,950 issued Feb. 4, 1986 and assigned to Pitney Bowes Inc.

Under control of the CPU when appropriate postal data information is provided from the input I, and all of the conditions such as limits and the like which may be preset in accordance with the entered data in storage in the NVM, are satisfied, a postage setting device SP will respond to an appropriate output signal from the CPU to generating a binary bit message addressed to a constituent temporary memory. At this point, the system has now accomplished its immediate function of setting the postage and readied the thermal printing system for image creation.

Figure 3:
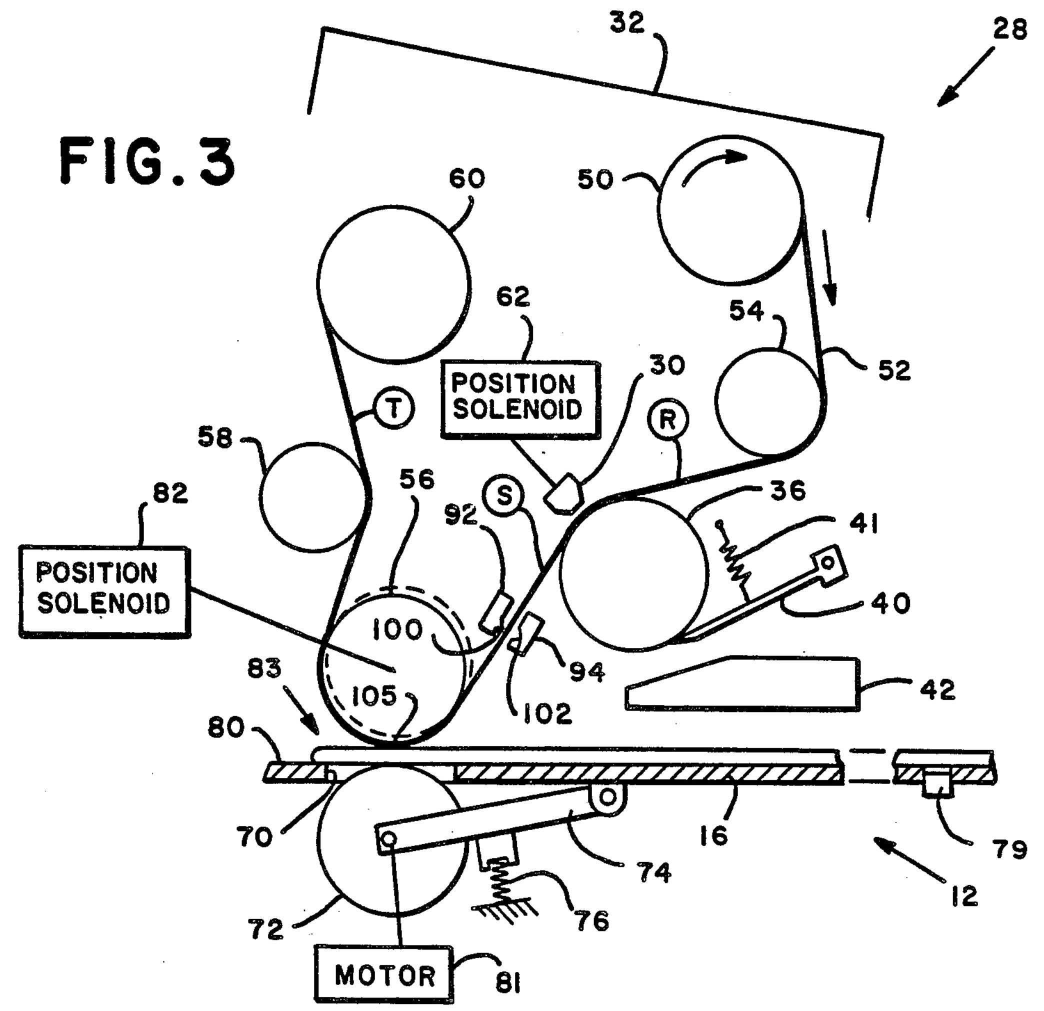
FIG. 3 is a schematic of the thermal tape cassette as positioned within the postage meter in accordance with the present invention.

Referring to FIG. 3, the postage printing unit or means 28 includes a sequential thermal head 30, a tape cartridge or cassette 32 and a scavenging roller 36. The thermal head 30 is of conventional design such available from Ricoh Company Ltd. of San Jose or Kyocera Company, Kyota, Japan. A typical device is shown and described in U.S. Pat. No. 4,429,318 issued Jan. 31, 1984 to Kobata. The thermal head 30 is serial-sequence binary responsive to the output of the microcomputer IC. The scavenging roller 36 is rotatably mounted by any conventional means within the postage meter radially opposite the thermal head 30. A blade 40 is pivotally mounted at one end to the housing 20 by any conventional means. The other end of blade 40 is biased into axial peripheral contact with the outer surface of the scavenging roller 36 by any conventional means such as by compression spring 41. A collection box 42 is detachably mounted by any conventional means within the meter housing 20 and orientated relative to the scavenging roller 36 and blade 40 to receive material dislodged from scavenging roller 36 by blade 40.

The tape cassette 32 is admitted into the housing 20 through a hinged door 44 (ref. to FIG. 1) and is detachably mounted therein by any conventional and suitable means. The tape cassette 32 includes a supply roller 50 rotatably mounted within the cassette 32 by any conventional means having a thermal tape 52 reeled therearound. The thermal tape 52 is threaded from supply roller 50 to a first guide roller 54 rotatably mounted within the cassette 32 by any conventional means, therefrom between thermal head 30 and scavenging roller 36 suitably mounted in the postage meter 20 by any suitable means, and therefrom impart around a transfer roller 56 rotatably mounted within the cassette 32 by any conventional means, and further therefrom a second guide roller 58 and finally to a take-up roller 60 rotatably mounted within the cassette 32 by any conventional means. The take-up roller 60 is suitably biased by any conventional means to maintain the thermal tape 52 in a appropriately taut state. To facilitate threading or positioning of the thermal tape 52, the thermal head 30 may be positionable to a threading position by a electrically responsive two position solenoid 62 actuated by a door switch 64 (ref. to FIG. 1) in a conventional manner upon the opening of door 44. Closing of door 44 causing deactuation of switch 64 and, thereby, causing the solenoid 62 to reposition the thermal head 30 to its original position.

In the here relevant portion, the mailing machine platen 16 includes a opening 70 through which journals a portion of the outer periphery of a back-up roller 72. The back-up roller 72 is rotatably supported on a bracket 74 by any conventional means, the bracket being pivotally mounted at one end to the mailing machine 12. Further, the back-up roller 72 is positioned by the bracket 74 peripherally opposite to the transfer roller 56 in tangential alignment. A second biasing means such as a spring 76 biases the bracket such that the back-up roller 72 is urged in the radial direction of the transfer roller 56.

Preferably, the thermal tape 52 within the cassette 32 is ink coated on one side with thermal sensitive ink. A suitable thermal tape 52 for the application address specifically herein is composed of a mylar film of approximate 0.25 to 0.5 mil thick having a thermally activated ink coating on the exposed side. The scavenging roller 36 is preferably preheat, during system operation using conventional techniques, to a temperature slightly below the ink transfer temperature threshold. The transfer roller 56 is heated to a temperature well above the ink transfer threshold temperature. By preheating the scavenging roller 36 thermal tape imaging efficiency is substantially improved. It is further noted, transfer efficiency is further positively impacted by the material composition of the scavenging roller 36. That is, the material composition of the outer peripheral region of the scavenging should be characterized by low thermal conductivity, such as by providing a outer peripheral coation of silicone, ceramic, porcelain or other suitable matter. Further, any suitable temperature sensing means may be employed to insure roller temperature maintenance, such as, conventional thermistors or PTC (positive temperature coefficient) heaters.

In operation, relevant information is keyed into the microcomputer which translates the information in accordance with programmed instructions in the permanent memory PM. The microcomputer then generates an instruction signal to the postage setting device SP which decodes the instruction, and addresses and stores the data for series forwarding of binary data to the thermal head 30. The back-up roller 72 is driven by any suitable conventional manner such as by a motor 81 under the controlling influence of microcomputer IC and driver unit DU. The back-up roller 72 is biased by spring 76 against a thermal tape portion backed by transfer roller 56 allowing the thermal tape 52 to be friction advanced by back-up roller 72.

When an approaching mailpiece 80 is sensed by sensor 79, which sensor 79 is fixably mounted in the platen 16 by conventional means and may be of any suitable type such as photo-electric in conventional informing communication with the microcomputer, the microcomputer IC instructs the thermal head 30 to trace an image on the thermal tape 52 being advance from location R to location S by back-up roller 72 (ref to FIGS. 4A & 4B). The thermal ink dispensed from the thermal tape during thermal head imaging is deposited on the scavenging roller subsequently removed therefrom by blade 40 and gravity fed to collection box 42 for collection and subsequent disposal. The arrival of the respective mailpiece 80 and imaged thermal tape between the transfer roller 56 and back-up roller 72 is timed by the microcomputer to be generally coincident.

The transfer roller being maintained at a temperature in excess of the thermal ink transfer temperature causes the thermal tape image to be transferred to the traversing mailpiece leaving a clean tape region (ref. to FIG. 4C).

It should now be appreciated, that the aforedescribed embodiment results in a substantial portion of unused thermal tape being delivered to the take-up reel should the back-up roller 72 be subjected to continues drive by microcomputer. To improve tape use efficiency, it is within the contemplation of the present invention for the microcomputer to cause motor 81 to be driven discontinuously in synchronization with the mailpiece stream. However, to further improve tape use efficiency, it is here preferred to employ a second two position solenoid 82 actuated by one of the drivers DU in response to microcomputer command and for the motor 81 to be continually actuated. The solenoid positions the transfer roller in a second position, indicated in phatam, thereby, removing friction drive from the transfer tape 52. The solenoid is prepositioned to its first position by the microcomputer only upon the delayed arrival of a mailpiece 80 as sensed by sensor 79 and remain in the second position only so long as necessary to image transfer. That is, sensor 79 senses the arrival of a traversing mailpiece and so informs the microcomputer. The microcomputer has previously caused secessive imaging of the thermal tape between the scavenging roller and the thermal print head. Upon the laps of an appropriate time delay commensurate to the arrival of the mailpiece to the print station 83, the microcomputer causes the solenoid 82 to reposition the transfer roller 56 in the first position for angular image transfer. After an appropriate time delay commensurate with the time required to image transfer, the microcomputer causes the solenoid 82 to position the transfer roller in the second position in readiment for the next traversing mailpiece. In this manner, the thermal tape is advanced only enough to accommodate a single imaging per-traversing mailpiece.

It is often desirous to utilize tape strips bearing the image and adhere the tape strips to the mailpiece. For example, where the mailpiece contains causes the mailpiece indicia area to assume a generally contorted surface contour. To accommodate mailpieces so characterized, the postage meter further includes an upper and lower jaw members 92 and 94, respectively through which the transfer tape 52 is threaded downstream of the thermal head. The jaws 92 and 94 are positionable between an open and closed position by any conventional such as by co-acting solenoides (not shown) responsive to the microcomputer. The jaws 92 and 94 include respective serrate blade portions 100 and 102, cooperatively aligned to sever a portion of the transfer tape 52 subsequent to imaging. When the jaws 92 and 94 are in the closed position, the thermo tape 52 is severed, such that a portion is held between the jaws 92 and 94, and serves as a tape guide for subsequent image transfer operation. The jaws 92 and 94 are not actuated to sever the thermal tape until a lead portion is located between the mailpiece 80 and transfer drum 56 at 105. In this configuration either scavenging roller 36 or supply reel 50 must be positively driven under the control of the microcomputer to synchronous to the arrival of a mailpiece to station 83.

Referring to FIG. 6, the thermal tape 52 can be modified to facilitate self adhesion by including longitudinally spaced transversely extending strips 86 of a suitable thermal responsive glue. The strips 86 are sufficiently spaced to allow imaging therebetween. The glue strip 86 are suitably composed to become tacky at a temperature commensurate to the transfer roller 56 temperature. It is appreciated that in the present described configuration the roller 58 and reel 60 are not functioned needed.

Referring now to FIGS. 5 and 6, alternatively, the cassette 28' may include the transfer roller 56 displacably by position solenoid 82, a feed drive roller 50', and a tape well 106. The tape well 106 is formed within the cassette 28' and includes a feed opening 108. A plurality of pre-cut strips of thermal tape 52' are stacked within the tape well 106. A flat 110 is biased by a spring 112 suitably mounted in the well 106 against the top-most thermal strip 52' such that the thermal tape stack is biased normally in the direction of feed opening 108.

The feed drive roller 50' includes a surface flat 112 which in the roller home position is opposite and abutting the resident thermal tape. The postage meter further includes drive motors 114 and 116 for driving, respectively, scavenging roller 36 and drive feed roller 50' under the control of the microcomputer IC through respective driver units DU and a second sensor 120.

The microcomputer being informed causes the solenoids 62 and 82 to position, respectively, the thermal head 30 and transfer roller 56 in their respective second positions, in addition, motor 116 is actuated causing feed drive roller 50' to deject a single thermal tape strip 50' from the wall 106. The trajectory of thermal tape strip 50', having thermal responsive glue strips 86, is traversing and inbetween print head 30 and scavenging roller 86. As the lead portion of thermal tape 52' traverses the sensor 20 the microcomputer is so informed of the thermal tape's position to cause thermal head 30 to be acted on by solenoid 62 positioning the thermal head 30 in its first position and imaging of the thermal head 50', the thermal tape 50' being now traversingly driven by the scavenging roller 36 under the influence of motor 114 controlled by microcomputer IC through respective drive unit DU. After appropriate time delay, the transfer roller is repositioned to its first position by the solenoid 82 under the instruction on the microcomputer. The repositioning of the transfer roller causes the glue strips 86 to become tacky and adhere the thermal strip 50' to the now arrived and traversing mailpiece 80.

What is claimed is:

1. A thermo-image transfer system for generating a thermal tape image transferrable to a workpiece, said thermo-image transfer system mounted in a support means, comprising;

a thermo-head having a generally linear array of gated "ON-OFF" heat elements;

a control means for selectively and coordinately gating said heat elements individually in either the "ON" or "OFF" state in response to said control means;

a scavenging roller aligned peripherally opposite said thermo-head and rotatably mounted in said support means;

delivery means for delivering said thermo-tape traversingly between and in opposite side communication with said scavenging roller and said thermal head, said delivery means including a cassette and a tape supply reel rotatably mounted in said cassette, said delivery means including a take-up reel and a transfer roller respectively rotatably mounted in said cassette;

said support means having means for receiving said cassette such that said thermal-tape can be threaded from said supply reel, between said thermo-head and said scavenging roller, and between said transfer roll and said back-up roller, to said take-up reel, said support means including means for displacing said thermo-head from a first position to a second position for positioning said cassette in said support means and returning said thermo-head to said first position after said cassette is positioned in said support means;

said thermal tape having thermally responsive ink coated on one side of, said ink coated side opposite said scavenging roller, whereby said control means causes said thermal head heat elements to coordinately gate relative to said traversing thermal tape causing an image to be created on said thermal tape;

a back-up roller rotatably mounted in said support means aligned opposite and peripheral to said transfer roller and biased radially towards said transfer roller;

means for heating said transfer roller to a temperature greater than said transfer tape's ink transfer temperature;

means for delivering a workpiece traversingly between said transfer roller and said back-up roller whereby said control means causes said thermal head heat elements to coordinately gate relative to said traversing thermal tape causing an image to be created on said thermal tape; and said delivery means further causing said transfer tape to generally peripherally traverse a portion of said transfer roller in pressure communication with said workpiece such that said thermal tape image created by said thermo-head on said thermo-tape in response to said control means is transferred to said traversing mailpiece.

2. A thermo-image transfer system for generating a thermal tape image transferrable to a workpiece, said thermo-image transfer system mounted in a support means, comprising:

a thermo-head having a generally linear array of gated "ON-OFF" heat elements;

a control means for selectively and coordinately gating said heat elements individually in either the "ON" or "OFF" state in response to said control means;

a scavenging roller aligned peripherally opposite said thermo-head and rotatably mounted in said support means;

delivery means for delivering said thermo-tape traversingly between and in opposite side communication with said scavenging roller and said thermal head, said delivery means including a cassette and a tape supply reel rotatably mounted in said cassette, said delivery means including a take-up reel and a transfer roller respectively rotatably mounted in said cassette;

said support means having means for receiving said cassette such that said thermal-tape can be threaded from said supply reel, between said thermo-head and said scavenging roller, and between said transfer roller and said back-up roller, to said take-up reel, said support means including means for displacing said transfer roller from a first position to a second position for mounting said cassette in said support means and returning said transfer roller to said first position after said cassette is mounted in said support means;

said thermal tape having thermally responsive ink coated on one side of, said ink coated side opposite said scavenging roller, whereby said control means causes said thermal head heat elements to coordinately gate relative to said traversing thermal tape causing an image to be created on said thermal tape;

a back-up roller rotatably mounted in said support means aligned opposite and peripheral to said transfer roller and biased radially towards said transfer roller;

means for heating said transfer roller to a temperature greater than said transfer tape's ink transfer temperature;

means for delivering a workpiece traversingly between said transfer roller and said back-up roller whereby said control means causes said thermal head heat elements to coordinately gate relative to said traversing thermal tape causing an image to be created on said thermal tape; and said delivery means further causing said transfer tape to generally peripherally traverse a portion of said transfer roller in pressure communication with said workpiece such that said thermal tape image created by said thermo-head on said thermo-tape in response to said control means is transferred to said traversing mailpiece.

3. A thermo-transfer system as claimed in claim 2, wherein said control means includes means for determining whether a mailpiece is properly positioned for image transfer between the transfer roller and the back-up roller and causing said transfer roller to be positioned in said second position when said mailpiece is improperly positioned, and said determining means communicating with said microcomputer.

4. A thermo-transfer system for generating a plurality of thermal tape images singularly transferrable to a respective one of a plurality of mailpieces sequentially traversing said thermo-image transfer system, said thermo-transfer system mounted in a postage meter mailing machine, comprising:

a thermo-head having a generally linear array of gated "ON-OFF" heat elements suitably mounted in said postage meter;

a control means for selectively and coordinately gating said heat elements individually in either the "ON" or "OFF" state in response to said control means suitably mounted in said postage meter, wherein said control means includes a programmable microcomputer, input means for providing information to said microcomputer, said microcomputer in response to said input means and in accordance with said microcomputer's programming to generate binary information signals transmitted to said thermo-head, a first two position solenoid for displacing said thermo-head from a first position to a second position to mount said cassette in said postage meter and for returning said thermo-head to said first position after said cassette is properly mounted in said postage meter, a second two position solenoid for displacing said transfer roller from a third position to a fourth position to mount said cassette in said postage meter and for returning said transfer roller to said third position after said cassette is properly mounted in said postage meter, sensing means for determining whether a traversing mailpiece is properly positioned for image transfer between the transfer roller-transfer tape and the back-up roller and causing said transfer roller to assume said fourth position if said mailpiece is improperly positioned or not positioned for image transfer;

a scavenging roller aligned peripherally opposite said thermo-head and rotatably mounted in said postage meter;

delivery means for delivering said thermo-tape traversingly between and in opposite side communication with said scavenging roller and said thermal head, said thermal tape having thermally responsive ink coated on one side of, said ink coated side opposite said scavenging roller, whereby said control means causes said thermal head heat elements to coordinately gate relative to said traversing thermal tape causing an image to be created on said thermal tape;

a transfer roller rotatably mounted in said delivery means;

a back-up roller rotatably mounted in said support means aligned opposite peripherally to said transfer roller and biased radially towards said transfer roller;

means for heating said transfer roller to a temperature greater than said transfer tape's ink transfer temperature;

means for delivering a workpiece traversingly between said transfer roller and said back-up roller;

said delivery means further causing said transfer tape to generally peripherally traverse said transfer roller in communication with said workpiece such that said image created by said thermo-head on said thermo-tape in response to said control means is transferred to said traversing mailpiece.

5. A thermo-transfer system as claimed in claim 4 wherein said delivery means comprises:

a cassette having a supply reel rotatably mounted therein;

a take-up reel rotatably mounted in said cassette;

said transfer roller being rotatably mounted in said cassette;

said support means having means for receiving said cassette such that said thermal-tape can be threadably received from said supply reel, between said thermo-head and said scavenging roller, and between said transfer roll and said back-up roller, to said take-up reel.

6. A thermo-transfer system for generating a plurality of thermal tape images singularly transferrable to a respective on of a plurality of mailpieces sequentially traversing said thermo-image transfer system, said thermo-transfer system mounted in a postage meter mailing machine, comprising:

a thermo-head having a generally linear array of gated "ON-OFF" heat elements suitably mounted in said postage meter;

a control means for selectively and coordinately gating said heat elements individually in either the "ON" or "OFF" state in response to said control means suitably mounted in said postage meter, wherein said control means includes a programmable microcomputer, input means for providing information to said microcomputer, said microcomputer in response to said input means and in accordance with said microcomputer's programming to generate binary information signals transmitted to said thermo-head, a first two position solenoid for displacing said thermo-head to second position when said cassette is positioned in said postage meter and return said thermo-head to a first original position after said cassette is properly mounted in said postage meter, a second two position solenoid for displacing said transfer roller to a second position when said cassette is positioned in said postage meter and return said transfer roller to a first original position after said cassette is properly mounted in said postage meter, sensing means for determining whether a traversing mailpiece is properly positioned for image transfer between the transfer roller-transfer tape and the back-up roller and causing said transfer roller to assume said first position or whether said mailpiece is improperly positioned or not positioned for image transfer causing said transfer roller to assume said second position;

a scavenging roller aligned peripherally opposite said thermo-head and rotatably mounted in said postage meter;

delivery means for delivering said thermo-tape traversingly between and in opposite side communication with said scavenging roller and said thermal head, said thermal tape having thermally responsive ink coated on one side of, said ink coated side opposite said scavenging roller, whereby said control means causes said thermal head heat elements to coordinately gate relative to said traversing thermal tape causing an image to be heated on said thermal tape;

a transfer roller rotatably mounted in said delivery means;

a back-up roller rotatably mounted in said mailing machine aligned opposite and peripheral to said transfer roller and biased radially towards said transfer roller;

means for heating said transfer roller to a temperature greater than said transfer tape's ink transfer temperature;

said mailing machine delivering a mailpiece stream singularly and traversingly between said transfer roller and said back-up roller;

said delivery means further causing stripes of said transfer tape to generally peripherally traverse a portion of said transfer roller in communication with said mailpiece, said thermal tape strip carrying an image created by said thermo-head on said thermo-tape in response to said control means and an adhesive to said traversing mailpiece.

7. A thermo-transfer system as claimed in claim 6 wherein said delivery means comprises:

a cassette having a supply reel rotatably mounted therein;

said transfer roller being rotatably mounted in said cassette;

said postage meter having means for receiving said cassette such that said thermal-tape can be threaded from said supply reel, between said thermo-head and said scavenging roller, and between said transfer roll and said back-up roller, to said take-up reel roller to assume said first position or whether said mailpiece is improperly positioned or not positioned for image transfer causing said transfer roller to assume said second position;

said postage meter further including a first and second clamp, said clamps are displaceably mounted in said postage meter at a location between said transfer roller and said thermal head and includes a matting serrated portion such that in a first spaced apart position said thermal tape journels between said clamps and in a second clamping position said clamps sandwich a portion of said thermal tape therebetween said matting serrated camp portion locerating a lead portion of said thermal tape.

8. A thermo-transfer system as claimed in claim 6 wherein said delivery means comprises:

a cassette having a supply well;

a plurality of thermal tape strips stacked in said well;

said supply well having a channel opening wherein a portion of the lower-most thermal tape strips resides therein and having means for biasing said thermal tape strips stack towards said channel opening;

a first drive roller having a peripheral land opposite and abbuting to said lower-most thermal tape strip in a home position;

means for driving said scavenging roller and said drive roller in cooperation with said back-up roller, said means control responsive to said control means.

* * * * *